(12) United States Patent
Namba

(10) Patent No.: US 6,917,991 B2
(45) Date of Patent: Jul. 12, 2005

(54) METHOD OF AND SYSTEM FOR EFFICIENTLY TRACKING MEMORY ACCESS BY DIRECT MEMORY ACCESS CONTROLLER

(75) Inventor: Mutsumi Namba, Shin-machi (JP)

(73) Assignee: Ricoh Co., Ltd., Tokyo (JP)

(*) Notice: Subject to any disclaimer, the term of this patent is extended or adjusted under 35 U.S.C. 154(b) by 0 days.

(21) Appl. No.: 10/391,238

(22) Filed: Mar. 18, 2003

(65) Prior Publication Data

US 2003/0212840 A1 Nov. 13, 2003

(30) Foreign Application Priority Data

Mar. 19, 2002 (JP) .................................... 2002-076230

(51) Int. Cl.[7] ........................... G06F 13/00; G06F 9/46; G06F 17/00

(52) U.S. Cl. ............................. 710/22; 710/32; 710/33; 710/113

(58) Field of Search ............................. 710/22, 32, 33, 710/113

(56) References Cited

U.S. PATENT DOCUMENTS 4,870,566 A * 9/1989 Cooper et al. ............... 710/113
2002/0016869 A1 * 2/2002 Comeau et al. ............. 709/324

* cited by examiner

Primary Examiner—Tammara Peyton
(74) Attorney, Agent, or Firm—Knoble Yoshida & Dunleavy

(57) ABSTRACT

The debug controller makes an efficient use of memory in tracing the direct memory access by the processor and the direct memory access controller for the purpose of debugging. The direct memory access for read and write is efficiently traced by first writing a next access memory address at a currently accessing memory address.

19 Claims, 11 Drawing Sheets

METHOD OF AND SYSTEM FOR EFFICIENTLY TRACKING MEMORY ACCESS BY DIRECT MEMORY ACCESS CONTROLLER

FIELD OF THE INVENTION

The current invention is generally related to a control of inputs and outputs, and more particularly related to a method of and a device for controlling inputs and outputs in a computer system.

BACKGROUND OF THE INVENTION

It is common to have one input and output device on a single large scale integration (LSI) circuit to include peripheral input output interfaces, direct memory access controllers (DMAC), memory controllers and processor interfaces in the system where the processor and the peripheral input and output devices share a common memory. One way to debug the DMAC operations of the input and output devices includes event detection by comparing an address to a predetermined address as proposed in Japanese Patent Publication Hei 6-35750. In tracing an address for access, although a debug device using an external trace memory is know for the processor, it is generally not practiced to trace the addresses that the DMAC accesses since the access consumes the trace memory.

After the image data is read from the memory and the image is rotated, a device such as a printer has a direct memory access that the image data is again written in the memory. When the image is rotated, for the operational efficiency there is a situation where the memory is not accessed in a simple ascending order. In this situation, when it is debugged, it is desired to trace the DMC access. However, since a general tracer needs a separate trace memory for debugging and the amount of data exceeds the trace for the memory access by the processor, the manufacturing cost of the debugger is undesirably high.

Furthermore, when an illegal DMA memory access is detected or the data written in memory is referred, it is difficult to have an expected value for capacity in the device such as LSI. It is necessary to have a relatively large debugging device that is operationally associated with the trace memory. The debugger cost is further increased.

Based upon the above described reasons, it still remains desirable to debug in an efficient manner at a low cost without placing an external debugger.

SUMMARY OF THE INVENTION

In order to solve the above and other problems, according to a first aspect of the current invention, an input output control device connected to a memory, a processor and an input output device for controlling an interface among the memory, the processor and the input output device, the processor and the input output device sharing the memory via the interface provided by the input output control device, the input output control device including: a direct memory access controller for controlling direct memory access to the memory by the input output device; an arbiter connected to the direct memory access controller and the processor for arbitrating the access to the memory by the processor and the direct memory access controller; an memory controller connected to the memory for controlling an interface with the memory; and a debug controller connected to the arbiter and the memory controller for issuing the memory controller a memory write request for access address information for debugging in response to a direct memory access request from the direct memory access controller.

According to a second aspect of the current invention, a computer system including: a memory; a processor; an input output device; and an input output control device connected to the memory, the processor and the input output device for controlling an interface among the memory, the processor and the input output device, the processor and the input output device sharing the memory via the interface provided by the input output control device, the input output control device further including: a direct memory access controller for controlling direct memory access to the memory by the input output device; an arbiter connected to the direct memory access controller and the processor for arbitrating the access to the memory by the processor and the direct memory access controller; an memory controller connected to the memory for controlling an interface with the memory; and a debug controller connected to the arbiter and the memory controller for issuing the memory controller a memory write request for access address information for debugging in response to a direct memory access request from the direct memory access controller.

According to a third aspect of the current invention, a method of tracing direct memory access, an input output control device is connected to a memory, a processor and an input output device for controlling an interface among the memory, the processor and the input output device, the processor and the input output device sharing the memory via the interface provided by the input output control device, the method including the steps of: receiving at a debug controller a direct memory access request via an arbiter; issuing a memory controller from the debug controller a memory write request for access address information for debugging in response to the direct memory access request from a direct memory access controller; and accessing the memory based upon the memory access request.

According to a fourth aspect of the current invention, a method of tracing direct memory access, an input output control device is connected to a memory, a processor and an input output device for controlling an interface among the memory, the processor and the input output device, the processor and the input output device sharing the memory via the interface provided by the input output control device, the method including the steps of: receiving at a debug controller a direct memory access request via an arbiter; issuing a memory controller from the debug controller a memory write request for access address information for debugging in response to the direct memory access request from a direct memory access controller; writing at least a next access address in the memory prior to performing a memory access; and accessing the memory based upon the direct memory access request.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Based upon incorporation by external reference, the current application incorporates all disclosures in the corresponding foreign priority document from which the current application claims priority.

Figure 1:
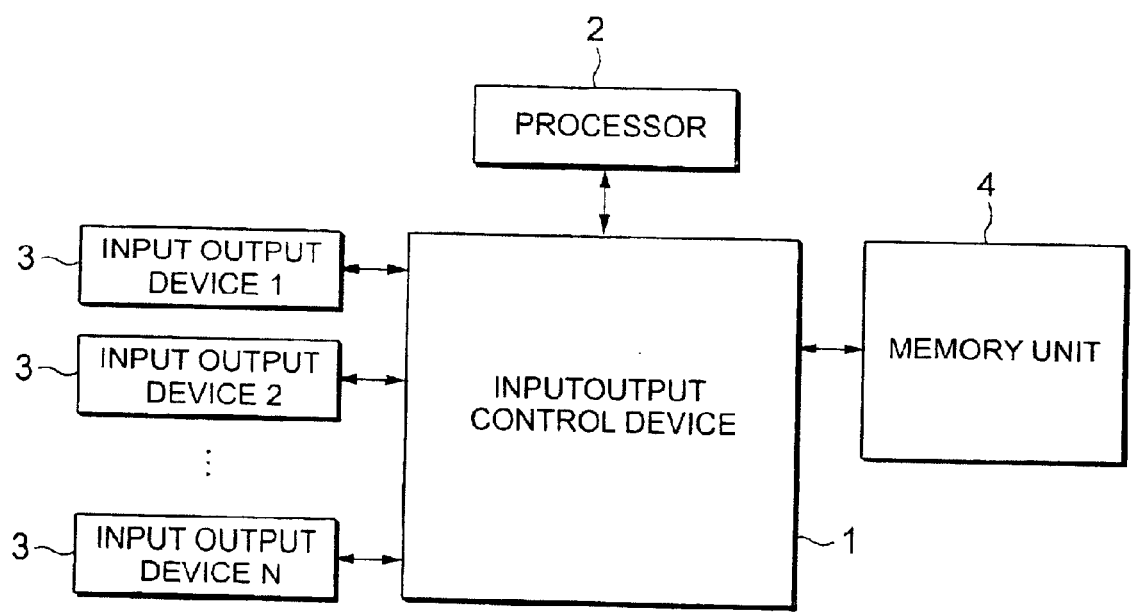
FIG. 1 is a block diagram illustrating components of one preferred embodiment of the computer system according to the current invention.

Referring now to the drawings, wherein like reference numerals designate corresponding structures throughout the views, and referring in particular to FIG. 1, a block diagram illustrates components of one preferred embodiment of the computer system according to the current invention. In the preferred embodiment, the computer system includes a processor 2, input output devices 3, a memory unit 4 that is commonly shared by the processor 2 and the peripheral input output devices 3 and an input and output control device for controlling the interface among the processor 2, the input output devices 3 and the memory unit 4.

Figure 2:
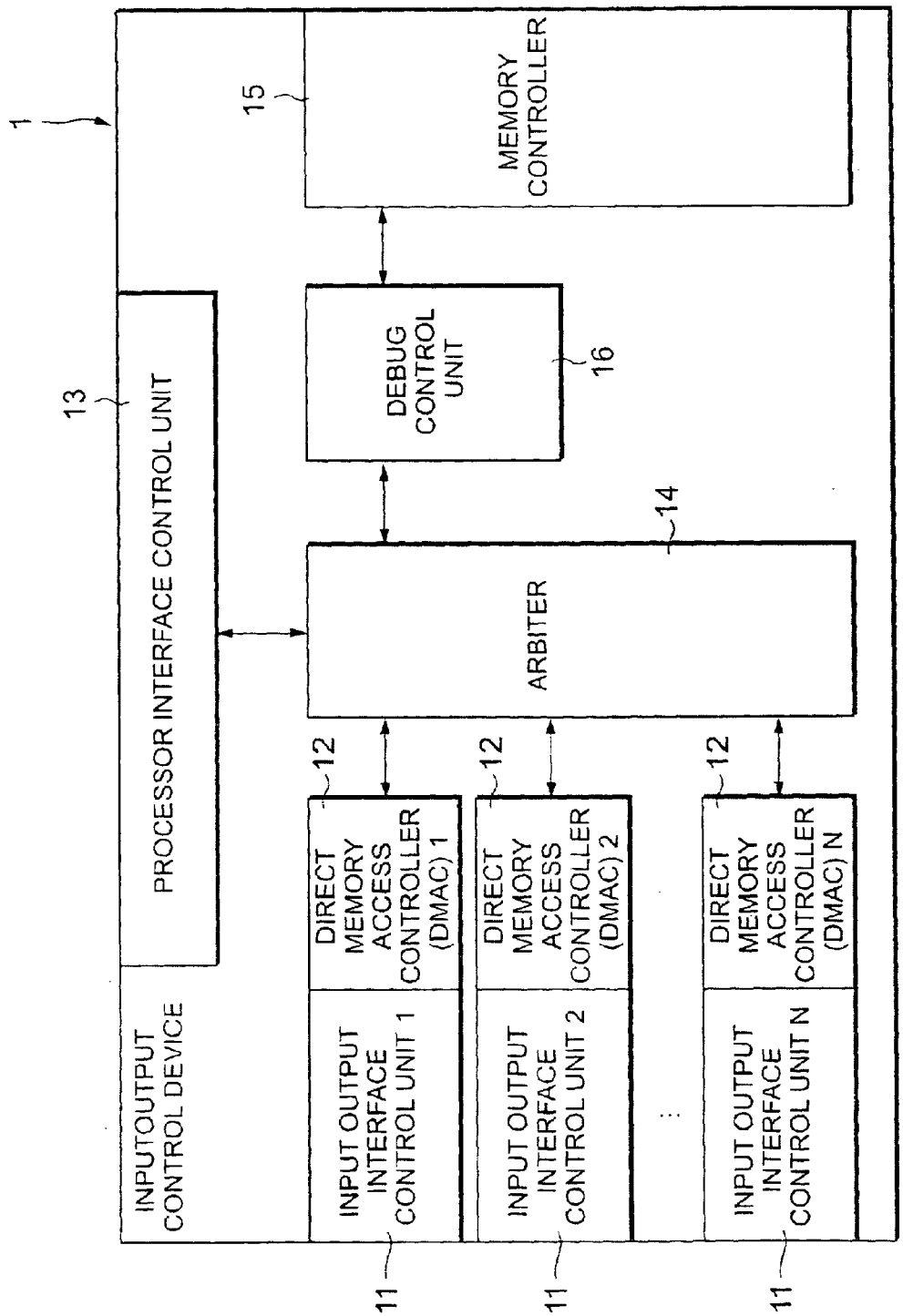
FIG. 2 is a block diagram illustrating components of one preferred embodiment of the input and output control device 1 according to the current invention.

Now referring to FIG. 2, a block diagram illustrates components of one preferred embodiment of the input and output control device 1 according to the current invention. The input and output control device 1 further includes an input output interface control unit 11 for controlling the interface of the input output device 3, a direct memory access controller (DMAC) 12 for the input and output device 3 to access the memory, a processor interface control unit 13 for controlling the interface of the processor 2, an arbiter 14 for making arbitration for the memory access between the processor 2 and the DMAC 12, a memory controller 15 for controlling the interface of the memory unit 4, and a debug control unit 16 located between arbiter 14 and the memory controller 15 for issuing the memory controller 15 a memory write request for the debugging access address information in response to the DMA request from the DMAC 12.

Figure 3:
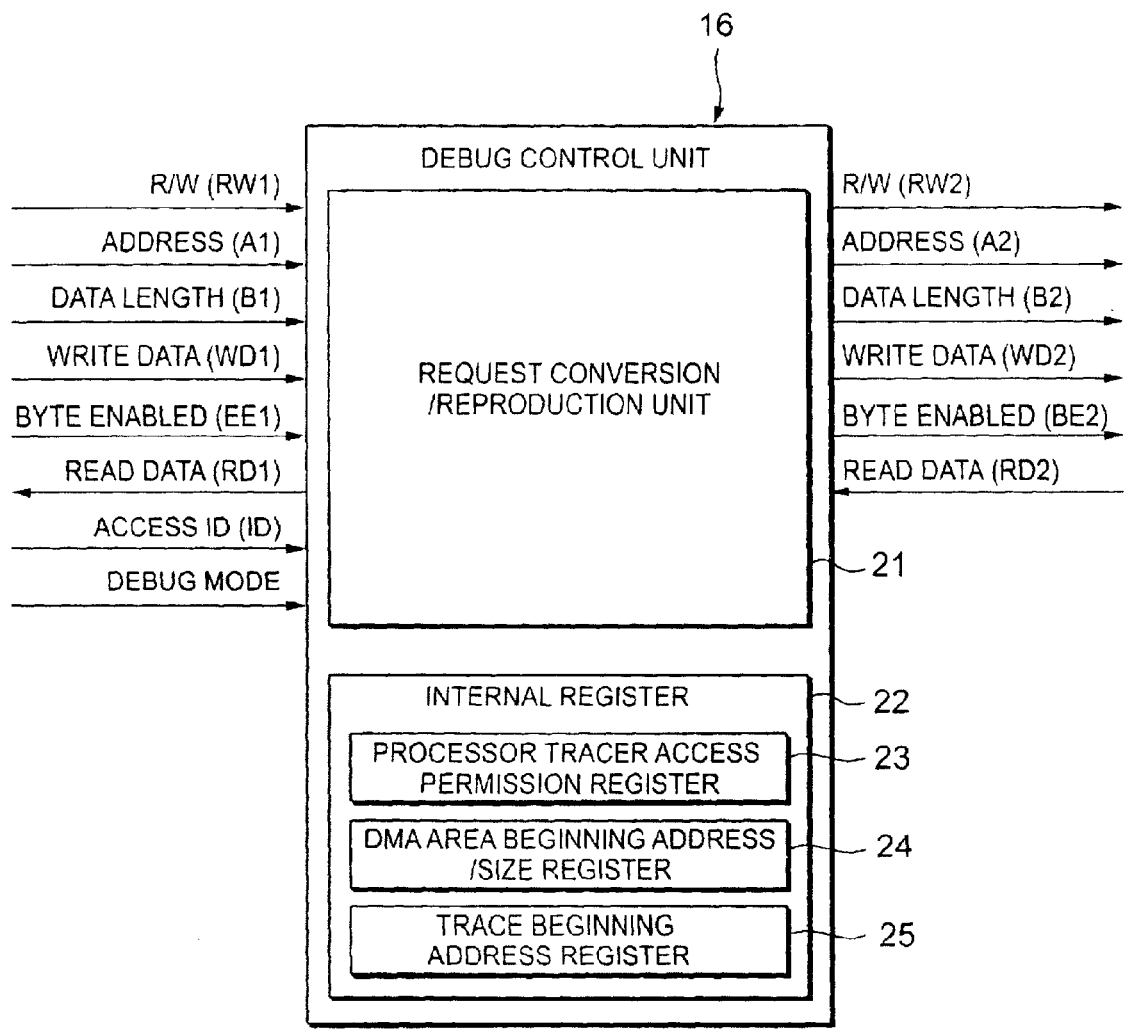
FIG. 3 is a block diagram illustrating components of one preferred embodiment of the debug control unit 16 according to the current invention.

Now referring to FIG. 3, a block diagram illustrates components of one preferred embodiment of the debug control unit 16 according to the current invention. The debug control unit 16 further includes a request conversion/ reproduction unit 21. The request conversion/reproduction unit 21 receives a group of requests from the arbiter 14. The requests from the arbiter 14 include a "debug enabled mode" signal for operating the debug mode, a read write signal RW1, an address signal A1, a data length signal B1, a write data signal WD1 at a memory write time, a byte enable signal BE1 at a memory write time and an ID signal for identifying an access request source including the processor 2 and the DMAC 12. Furthermore, the requests to the memory controller 15 include a read write signal RW2, an address signal A2, a data length signal B2, a write data signal WD2 at a memory write time and a byte enable signal BE2 at a memory write time. The read data signal RD2 is received from the memory controller 15 at a memory read time, and the read data RD1 is returned to the side of the arbiter 14. The debug control unit 16 further includes an internal register 22 that contains a processor tracer access permission register 23 for indicating that the processor has access to the trace data, a DMA area beginning address/size register 24 for indicating a beginning address and a size or an ending address for the DMAC 12 to use in the memory 4 and a trace beginning address register 25 for indicating a beginning address of the memory at the onset of the trace.

Still referring to FIG. 3, in the preferred embodiment of the computer system, the access information for accessing the memory 4 is also kept in the memory 4 when the operation of the DMAC 12 is being debugged under the debug mode. In comparison to the non-debug mode, almost twice the amount of the memory capacity is necessary in the debug mode. For example, when a write access occurs for one word by the DMA, the memory controller 15 requests for two words and adds a next access address to the write data. In case of read access, one word request is generated for writing a access address, and the read access is performed.

Figure 4:
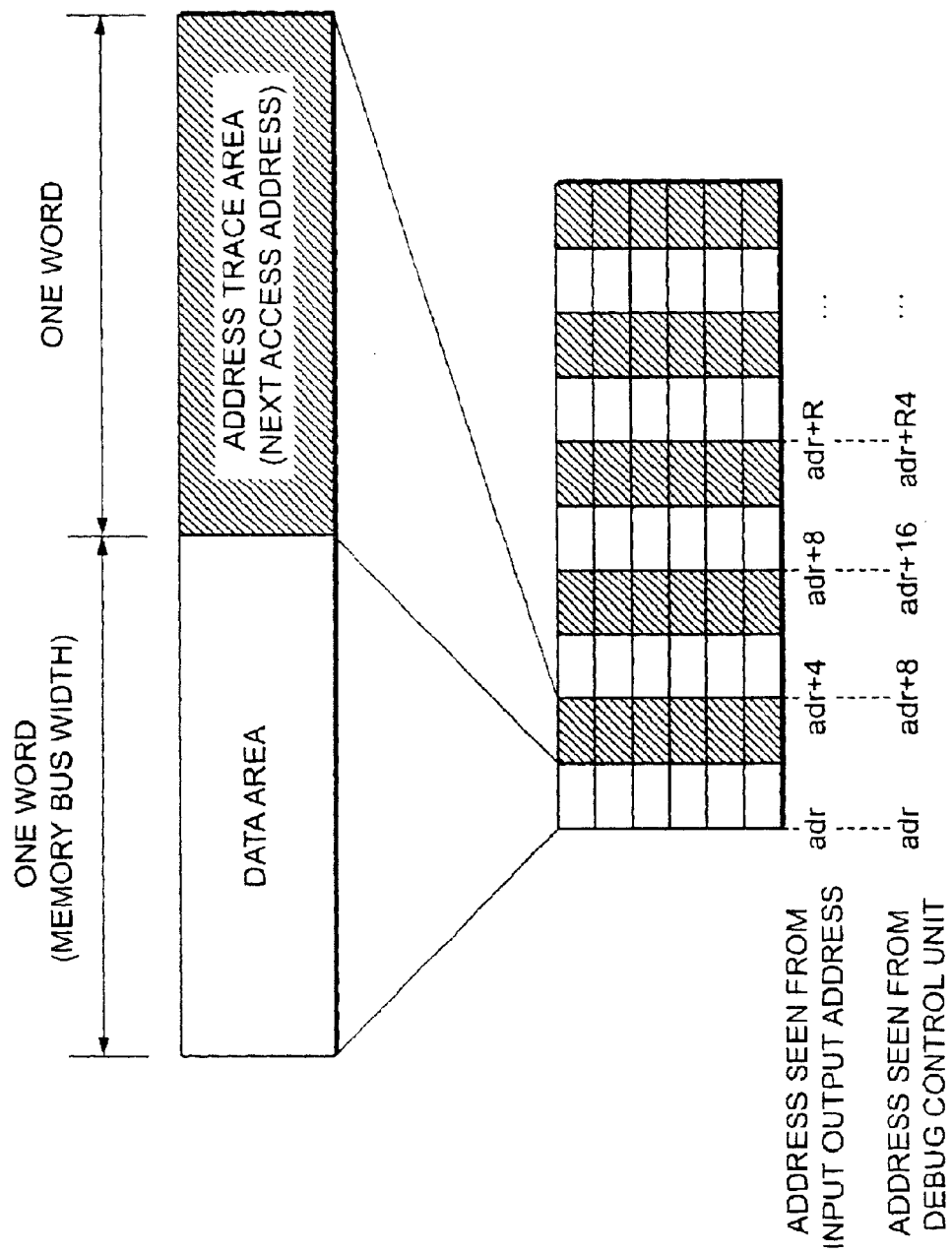
FIG. 4 is a block diagram illustrating the content of the memory 4 during the debug operation mode according to the current invention.

Now referring to FIG. 4, a block diagram illustrates the content of the memory 4 during the debug operation mode according to the current invention. In the conceptual figure, twice the width of the memory bus or two words is one set. The upper word is a data area while a lower area is an area for address tracing or for registering a next access address. In the debug control unit 16, since address conversion is also performed by adding address trace information, the address trace area is hidden from the input output device 3 or the DMAC 12. The input output device 3 or the DMAC 12 sees the data area to be continuous. When the debug operation is prohibited, the request from the arbiter 14 is directly associated with the request to the memory controller 15. In other words, the access ID is not used. The memory access of each of the input output devices and the processor 2 is arbitrated by the arbiter 14 and is performed.

Figure 5:
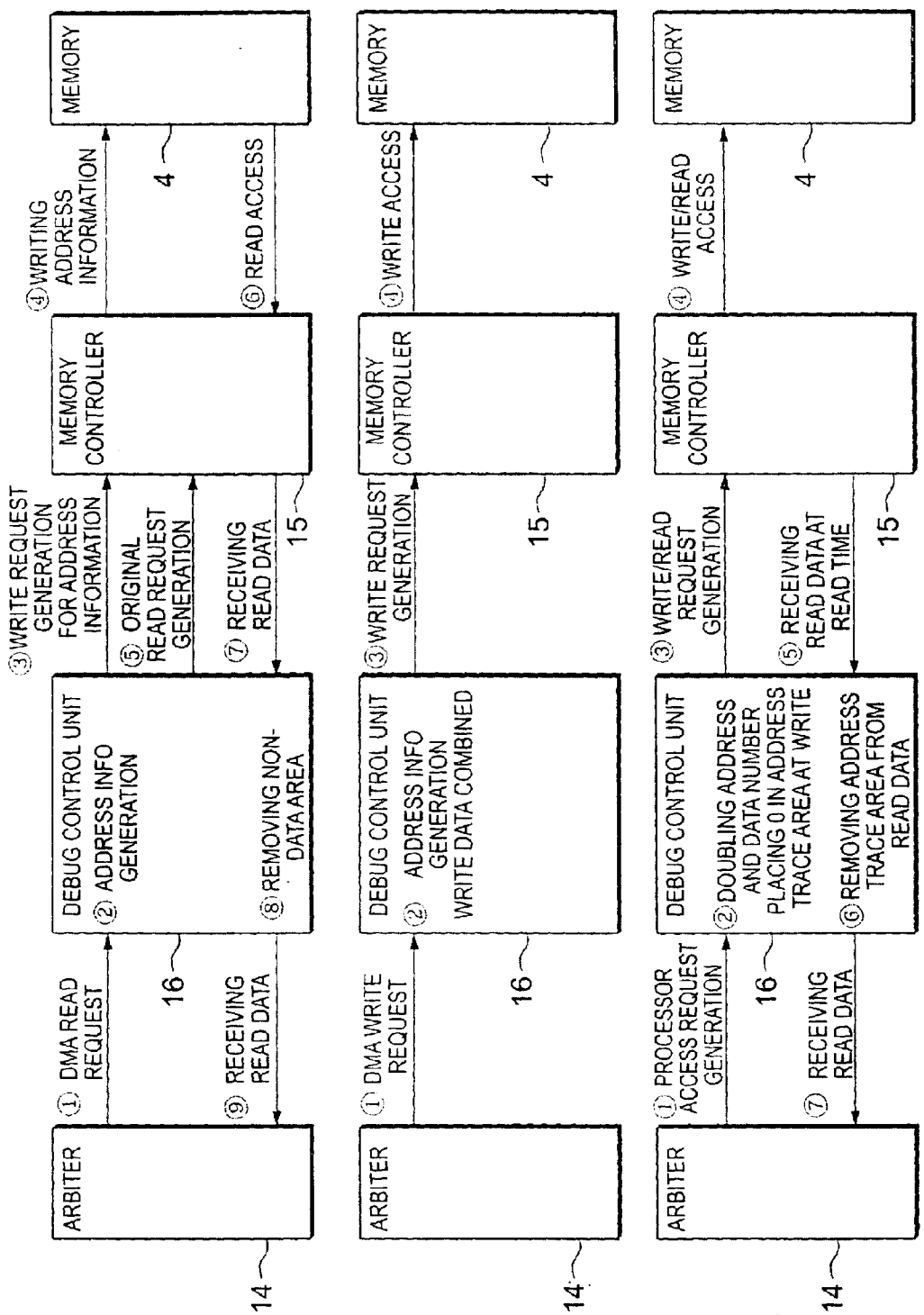
FIGS. 5A through 5C are block diagrams illustrating the process sequence respectively at the read time, the write time and the processor access time according to the current invention.

Now referring to FIGS. 5A through 5C, block diagrams illustrate the process sequence respectively at the read time, the write time and the access time according to the current invention. FIG. 5A illustrates the process sequence 1 through 9 at the read time. When the arbiter 14 issues the read request for the DMA in a process sequence 1, a next access address is written or traced in the memory 4 in a process sequence No. 4 before the debug control unit 16 accesses the data for read in a process sequence No. 6. That is, the debug control unit 16 outputs to the memory controller 15 the write request from the address information in a process sequence No. 3. After the memory controller 15 traces the next access address in the memory 4 in a process sequence No. 4, a true read request is generated in a process sequence No. 5. In this case, when the current data is the last data, the value, "0" is written.

FIG. 5B illustrates the process sequence 1 through 4 at the write time. The debug control unit 16 combines a next access address with the data to be written in a process sequence No. 2 after the arbiter 14 issues the write request for the DMA in a process sequence No. 1. The debug control unit 16 outputs to the memory controller 15 the write request of the data in process sequence No. 3 and writes it in the memory 4 process sequence No. 4.

FIG. 5C illustrates the process sequence 1 through 7 at the processor access time. When a processor access request from the arbiter 14 is received in a process sequence No. 1, the debug control unit 16 increases the number of data by two folds or makes the address size to be twice in process sequence No. 2. When it is a memory write time, the address trace area is filled with zeroes in the process sequence No. 2. The debug control unit 16 outputs to the memory controller 15 a write memory request or a read memory request in process sequence No. 3. When the processor 2 is enabled to have trace access and to have access to the DMA area, the request from the arbiter 14 is placed in the memory controller 15. Thus, both the address trace area and the data area are accessible. The debug control unit 16 determines whether it is access to the process 2 or the DMAC 12 based upon the ID input signal.

Figure 6:
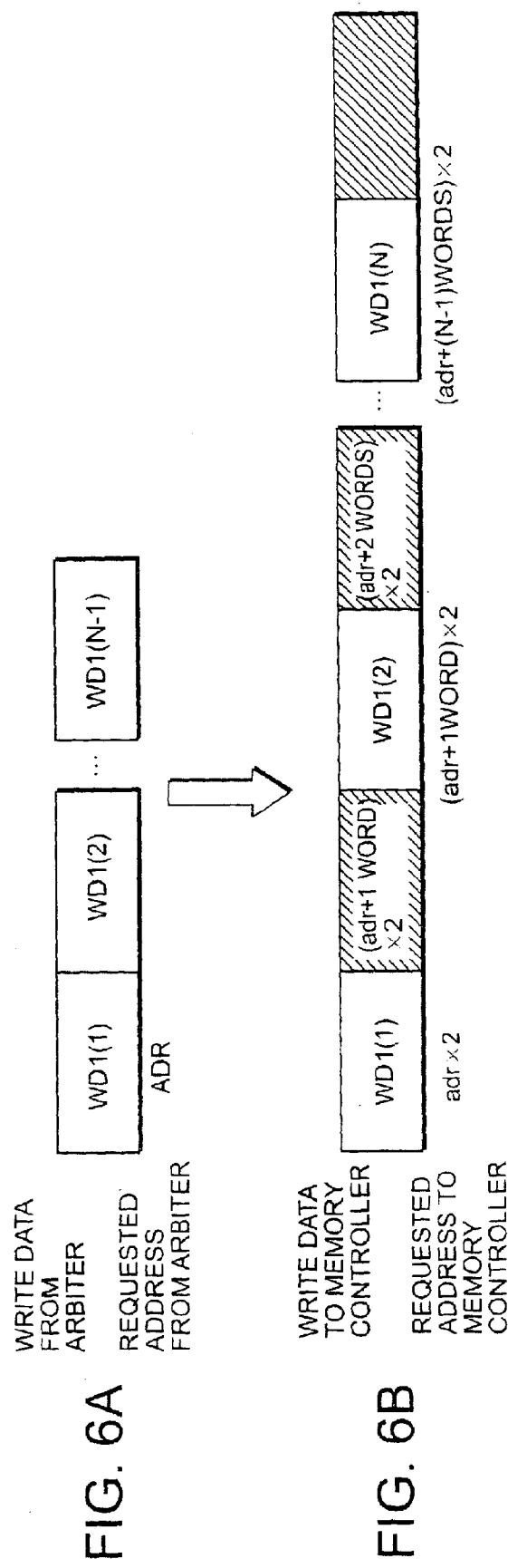
FIGS. 6A and 6B are diagrams illustrating a way to combine the write data and the address trace as described with respect to FIG. 5C.

FIGS. 6A and 6B illustrate a way to combine the write data and the address trace as described with respect to FIG. 5C. When there is a write data address request from the arbiter 14 as shown in FIG. 6A, the debug control unit 16 combines the write data and the address trace to indicate to the memory controller 15 the write data-request address combination as shown in FIG. 6B. For example, the request address in the write data WD1 becomes from "adr" to "adr×2." The request address of the write data WD1 (2) or "(adr+1 word)×2" is inserted immediately after the write data WD1 (1). When the trace data access is enabled by the register 23 and the access address is outside of the use area, the access from the processor 2 is limited to the data portion, and the address trace is hidden. The memory access by the processor 2 is not traced.

Figure 7:
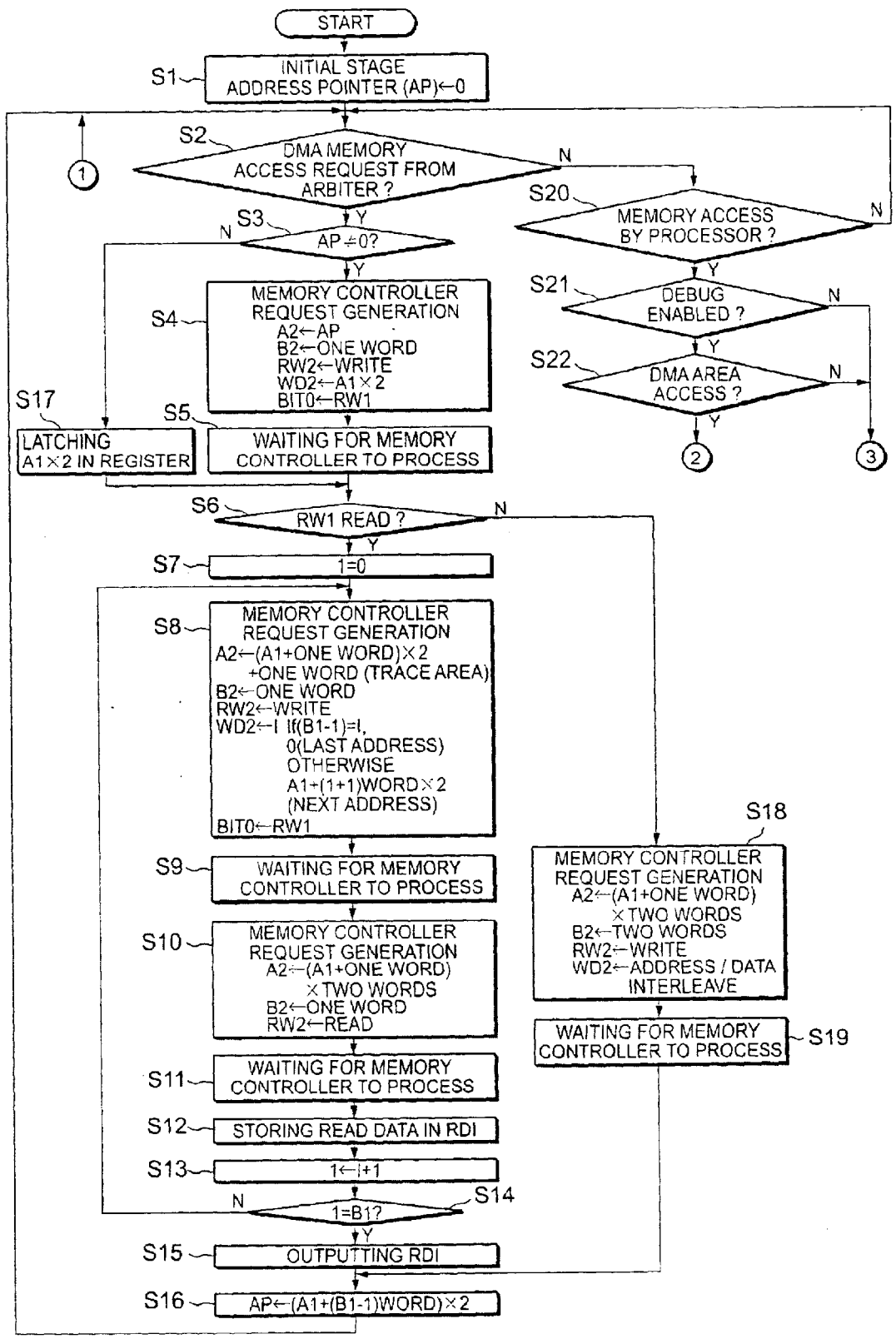
FIGS. 7 and 8 are a flow chart illustrating steps involved in a preferred process by the debug control unit 16 during the debug operation according to the current invention.
Figure 8:
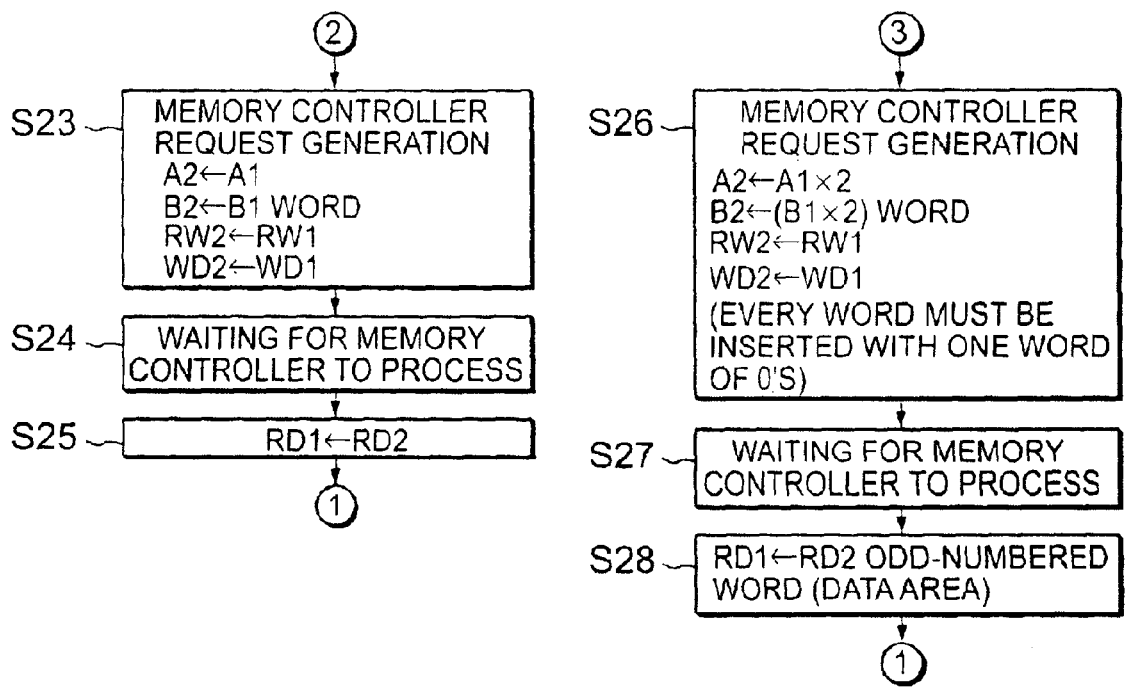

FIGS. 7 and 8 are a flow chart illustrating steps involved in a preferred process by the debug control unit 16 during the debug operation according to the current invention. In a step S1, an address pointer (AP) is initialized to "0." It is determined whether or not the DMA memory access request is generated at the arbiter 14 in a step 2.

When the DMA memory access request is generated in the step 2, the preferred process proceeds to a step S3, where it is further determined whether or not the AP is non zero. If is determined in the step 3 that the AP contains zero, the value of "A1×2" is latched in a register 25 as the trace beginning address in a step 17 and the preferred process proceeds to a step S6. If is determined in the step 3 that the AP contains a non-zero value, the following requests are made to the memory controller in a step S4. In the step 4, the content of the AP is placed in the address A2; one word length is placed in the data length B2; the Read-Write RW2 is set to "write" and "A1×2" is set to the write data WD2. Bit 0 of the WD2 is set to the value of the RW1. Then, the preferred process waits for the processing by the memory controller 15 in a step 5.

Referring back to the step S2, if it is determined that there is no DMA memory access from the arbiter 14, it is further determined whether or not a memory access request is made by the processor in a step S20. If there is no memory access request, the preferred process returns to the step 2. On the other hand, if there is a memory access request in the step S20, it is further determined whether or not the debug access is enabled in a step S21. If the debug access is enabled as determined in the step S21, it is finally determined whether or not the DMA area access is permitted in a step S22.

Referring to FIG. 8, if it is determined in the step S22 that the DMA area access is permitted, the following steps 23 through 25 are performed. The following requests are made to the memory controller in a step S23. In the step 23, the content of the address A1 is placed in the address A2; one B word length is placed in the data length B2;

the Read-Write RW2 is set to the content of the RW1 and the write data WD2 is set to the content of the WD 1. Then, the preferred process waits for the processing by the memory controller 15 in a step 24. After the content of the read data RD1 is set to that of the read data RD2, the preferred process returns to the step S2.

Referring to FIG. 8, if either result of the determinations in the steps S21 and S22 is negative, the following steps S26 through S28 are performed. The following requests are made to the memory controller in a step S26. In the step 26, the content of the address A1 times two is placed in the address A2; two-B word length is placed in the data length B2; the Read-Write RW2 is set to the content of the RW1 and the write data WD2 is set to the content of the WD1. Every word is filled with one word of "0." Then, the preferred process waits for the processing by the memory controller 15 in a step 27. After the content of the read data RD1 is set to odd words of the read data RD2, the preferred process returns to the step S2. That is, the odd words are data areas.

Referring back to FIG. 7, in the step 6, it is determined whether or not RW1 has been set to "READ." If it is determined in the step 6 that RW1 has not been set to "READ," it means that RW1 has been set to "WRITE." In this case, the preferred process proceeds to a step S18, where the following requests are made to the memory controller. In the step 18, "(A1+1)×2" is placed in the address A2; one B word length is placed in the data length B2; the Read-Write RW2 is set to contain "WRITE" and the write data WD2 is set to contain the address/data interleave as described with respect to FIG. 6. After the preferred process waits for the processing by the memory controller 15 in a step 19, the address pointer AP is set to "A1+(B1−1) word)×2 in a step 16. Then, the preferred process returns to the step S2.

On the other hand, if it is determined in the step 6 that RW1 has been set to "READ," the preferred process proceeds to a step S7, where a counter 1 is initialized to zero. The following requests are made to the memory controller in a step 8. In the step 8, "(A1+1 word)×2+one word (trace area)" is placed in the address A2; one B word length is placed in the data length B2; the Read-Write RW2 is set to contain "WRITE" and the write data WD2 is set to contain I or 0 (last address) when (B1−1) otherwise "(A1+1 word)×2 (next address). Bit 0 of the WD2 is set to the value of the RW1. After the preferred process waits for the processing by the memory controller 15 in a step 9, an additional request is made to the memory controller 15 in a step S10. In the step 10, "(A1+1 word)×2 words" is placed in the address A2; one B word length is placed in the data length B2; the Read-Write RW2 is set to contain "READ." After the preferred process waits for the processing by the memory controller 15 in a step 11, the read data RD1 is accumulated in a step S12. The counter 1 is incremented by one in a step S13. In a step S14, it is determined whether or not the counter 1 is equal to the data length B1. If it is determined in the step S14 that the counter is not equal to the data length B1, the preferred process returns to the step S2. On the other hand, if it is determined in the step S14 that the counter is equal to the data length B1, the preferred process outputs the read data RD1 to the arbiter 14 in a step S15 and repeats the step S16.

Figure 9:
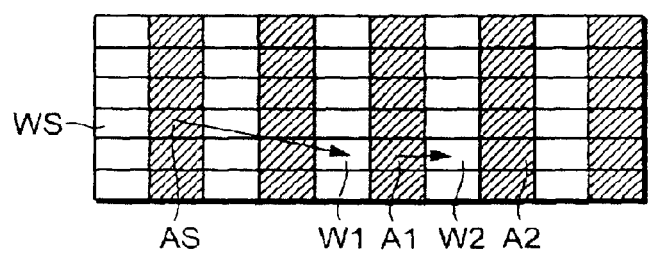
FIG. 9 illustrates a way to combine the write data and the address trace as described with respect to FIG. 5C.

The processor 2 follows the address trace that was obtained by the above described preferred process. Initially, the processor 2 reads the trace beginning address of the debug control unit 16 from the register 25. As described, the corresponding address and data are stored as a pair at the address in the memory unit 4. By tracing the trace address in the list structure, the access by the DMAC 12 is traced. For example, when the trace beginning address is the data area WS as shown in FIG. 9, the next data area W1 is traced from the next address trace area AS in the immediately proceeding one word. Similarly, the next data area W2 is traced from the next address trace area A1 in the immediately proceeding one word. In the above manner, the access by the DMAC 12 is performed. The important debug information is provided for the erroneous access analysis. Furthermore, since the area that the DMA uses is identified by the content of the internal register 22, when the processor 2 accesses an order or instruction code in the memory 4, the debug control unit 16 destroys the trace address portion and only the code portion is given to the processor 2 as described before with respect to the process sequence No. 6 in FIG. 5C.

Figure 10:
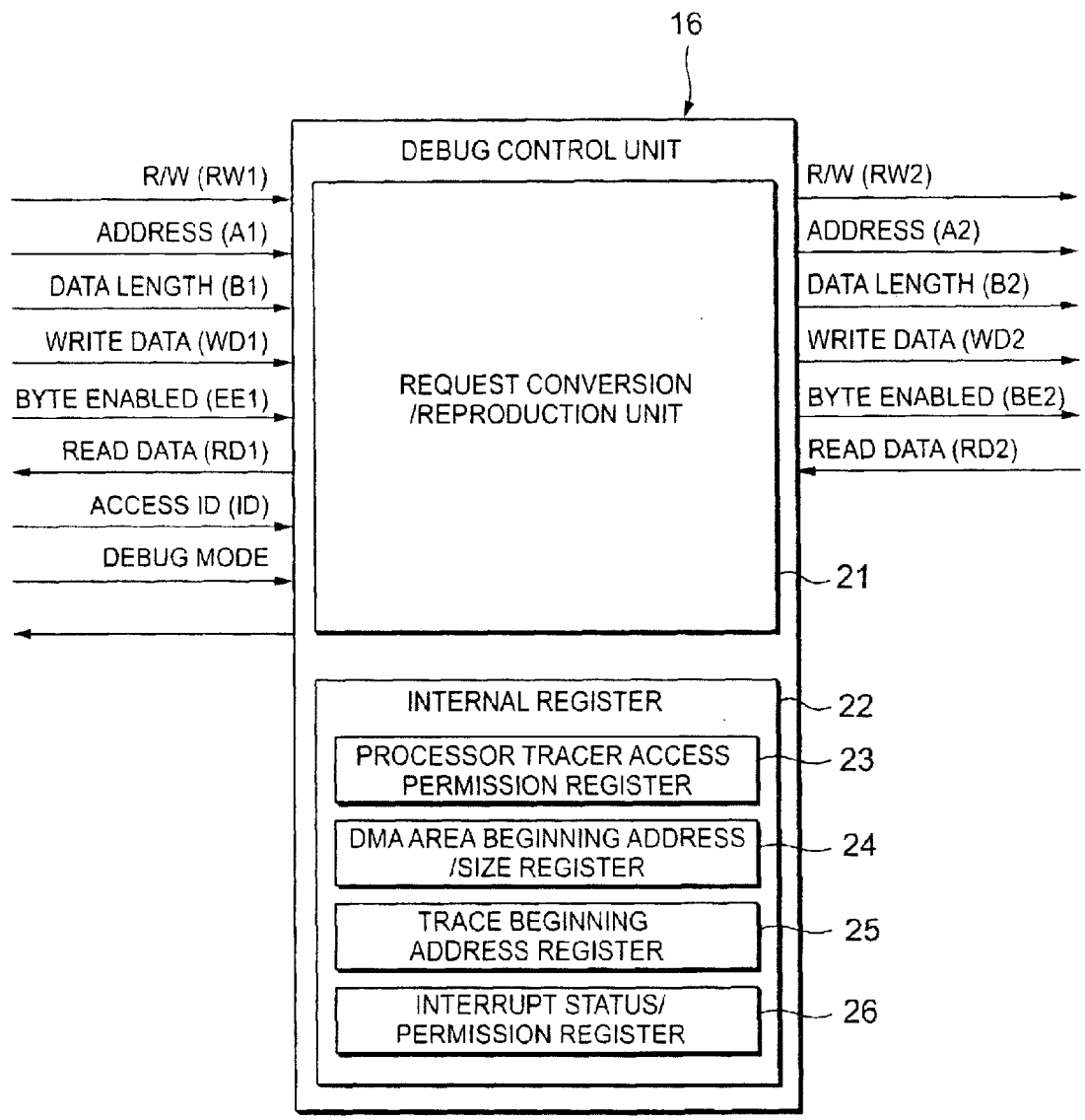
FIG. 10 is a block diagram illustrates a second preferred embodiment of the debug control unit 16 according to the current invention.

Now referring to FIG. 10, a block diagram illustrates a second preferred embodiment of the debug control unit 16 according to the current invention. The second preferred embodiment is substantially identical to the first preferred embodiment as shown in FIG. 3. However, the difference between the first and second preferred embodiments includes that the second preferred embodiment has an interrupt output with respect to the arbiter 14. For this purpose, in the second preferred embodiment, the internal register 22 further includes a register 26 for registering a status.

Figure 11:
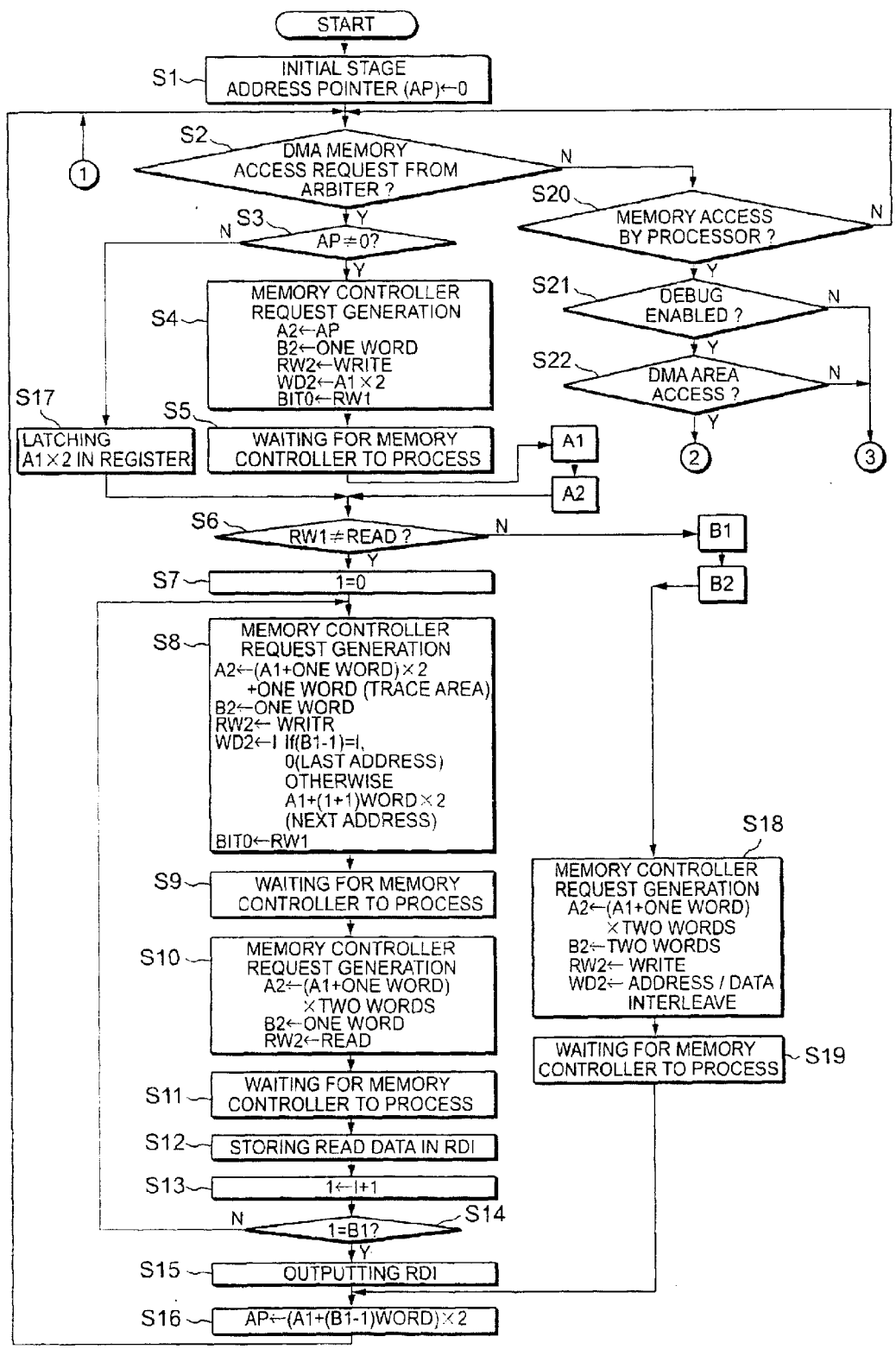
FIGS. 11 and 12 are a flow chart illustrating steps involved in a second preferred process of generating address trace according to the current invention.

Now referring to FIGS. 11 and 12, flow charts illustrate steps involved in a second preferred process of generating address trace according to the current invention. The steps involved in the second preferred process are substantially identical to those of the first preferred process as depicted with respect to FIGS. 7 and 8. In addition to the above steps, the second preferred process further includes steps S31 through S35 as illustrated in FIG. 12C. In the steps S31 through S33, the address trace area is read before the address tracing. That is, the following request is generated to the memory controller unit 15 in a step S31. The address A2 is set to "A1×2;" the data length B2 is set to "B1×2 words;" the read-write RW2 is set to the content of the RW1; and the write data WD2 is set to the content of the write data WD1. After the second preferred process waits for the processing by the memory controller 15 in a step 32, the read data is stored in the RDtmp in a step 33. It is further determined in a step 34 whether or not a marking has been detected in the RDtmp even word or address area. If the marking has been detected in the step 34, an interrupt status is generated in a step S35. In other words, the interrupt is outputted to the processor 2 in the step S35. On the other hand, if no marking is detected in the step 34, the second preferred process resumes to the ending point A2.

The processor 2 leaves the trace access enabled. When the DMAC 12 accesses if a predetermined marking data is written in the address trace area of the address to cause an interrupt, the debug control unit 16 reads out the address trace are of the above address. However, by detecting the predetermined marking, an interrupt is generated. An exemplary marking is a particular value such as 0xFFFFFFFF or a user definable value in an internal register.

Figure 12A:
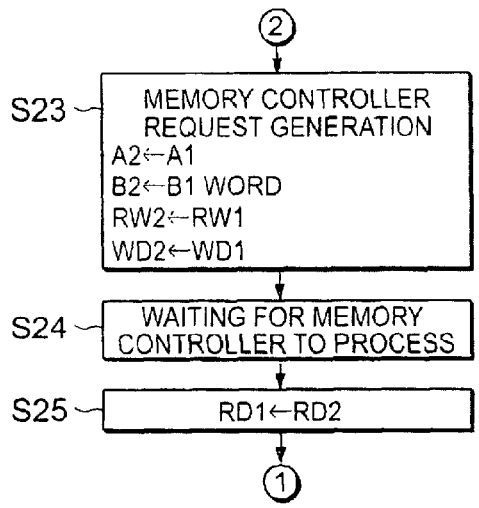
Figure 12B:
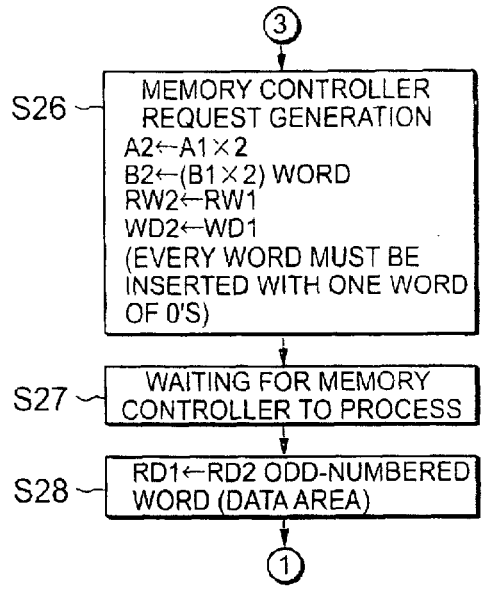
Figure 12C:
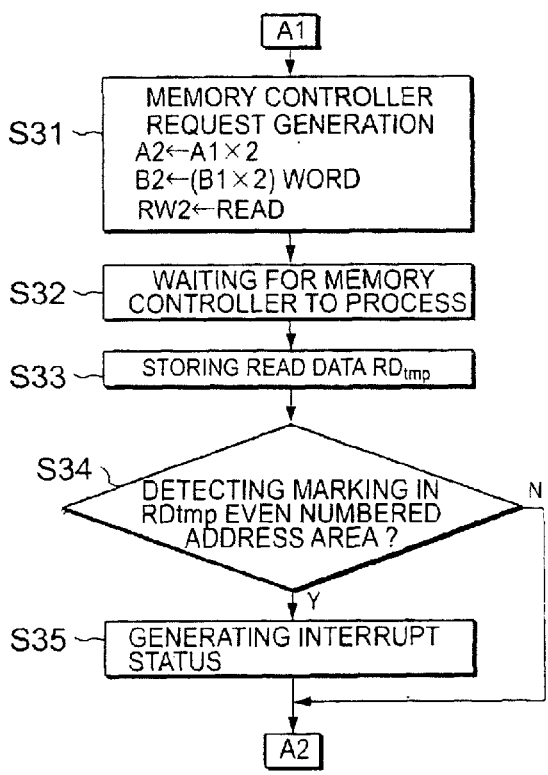
Figure 12D:
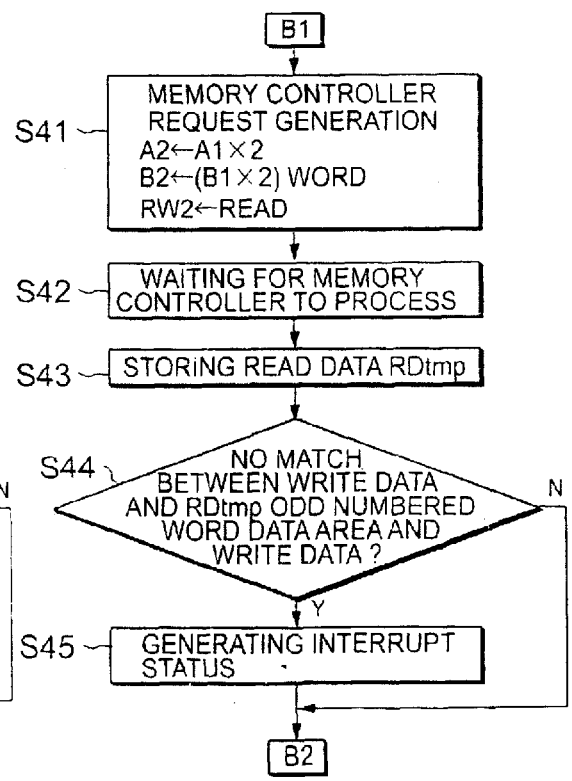

Now referring to FIG. 12D, n addition to the above steps S31 through S35, the second preferred process further optionally includes steps S41 through S45 as illustrated in FIG. 12D. In the steps S41 through S43, the address trace area is read before the address tracing. That is, the following request is generated to the memory controller unit 15 in a step S41. The address A2 is set to "A1×2;" the data length B2 is set to "B1×2 words;" the read-write RW2 is set to the content of the RW1; and the write data WD2 is set to the content of the write data WD1. After the second preferred process waits for the processing by the memory controller 15 in a step 42, the read data is stored in the RDtmp in a step 43. The above steps 41 through 43 are substantially identical to the steps 31 through 33 of FIG. 12C. When the steps 31 through 33 are performed, then the steps 41 through 43 are not repeated. It is further determined in a step 44 whether or not a marking has been detected in the RDtmp odd word or address area. If the marking has been detected in the step 44, an interrupt status is generated in a step S45. In other words, the interrupt is outputted to the processor 2 in the step S45. On the other hand, if no marking is detected in the step 44, the second preferred process resumes to the ending point B2. When the processor 2 writes an expected value, it is not necessary to leave the trace access enabled. By the above steps, by writing an expected value in an area where the DMAC 12 is supposed to access and generating an interrupt upon discovering no match, an interrupt is generated for an erroneous expected value.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. An input output control device connected to a memory, a processor and an input output device for controlling an interface among the memory, the processor and the input output device, the processor and the input output device sharing the memory via the interface provided by the input output control device, the input output control device comprising:

a direct memory access controller for controlling direct memory access to the memory by the input output device;

an arbiter connected to said direct memory access controller and the processor for arbitrating the access to the memory by the processor and said direct memory access controller;

an memory controller connected to the memory for controlling an interface with the memory; and a debug controller connected to said arbiter and said memory controller for issuing said memory controller a memory write request for access address information for debugging in response to a direct memory access request from said direct memory access controller.

2. The input output control device according to claim 1 wherein said debug controller issues said memory controller the memory write request to indicate writing of a next access address in the memory prior to a read access of data as specified by a read request in response to the direct memory access request indicating a memory read.

3. The input output control device according to claim 1 wherein said debug controller issues said memory controller the memory write request to indicate writing of combined data of write data and a next access address in the memory in response to the direct memory access request indicating a memory write.

4. The input output control device according to claim 1 wherein said debug controller issues said memory controller the memory write request to indicate writing at a corresponding address in the memory in response to the direct memory access request, said debug controller performing a read access, said debug controller reporting to the processor upon detecting a predetermined marking indicative of prohibited access of an data area referenced by the corresponding address by said direct memory access controller during a normal operation.

5. The input output control device according to claim 1 wherein said debug controller issues said memory controller the memory write request to indicate writing at a corresponding address in the memory in response to the direct memory access request, said debug controller performing a read access, said debug controller reporting to the processor a result of a comparison between a first data of a data area as referenced by the corresponding address and a second data of a data area as specified in the memory write request.

6. A computer system comprising:

a memory;

a processor;

an input output device; and an input output control device connected to said memory, said processor and said input output device for controlling an interface among said memory, said processor and said input output device, said processor and said input output device sharing said memory via the interface provided by said input output control device, said input output control device further comprising:

a direct memory access controller for controlling direct memory access to the memory by the input output device;

an arbiter connected to said direct memory access controller and the processor for arbitrating the access to the memory by the processor and said direct memory access controller;

an memory controller connected to the memory for controlling an interface with the memory; and a debug controller connected to said arbiter and said memory controller for issuing said memory controller a memory write request for access address information for debugging in response to a direct memory access request from said direct memory access controller.

7. A method of tracing direct memory access, an input output control device is connected to a memory, a processor and an input output device for controlling an interface among the memory, the processor and the input output device, the processor and the input output device sharing the memory via the interface provided by the input output control device, the method comprising the steps of:

receiving at a debug controller a direct memory access request via an arbiter;

issuing a memory controller from the debug controller a memory write request for access address information for debugging in response to the direct memory access request from a direct memory access controller; and accessing the memory based upon the memory access request.

8. The method of tracing direct memory access according to claim 7 wherein the memory write request indicates writing a next access address in the memory prior to a memory read access of reading data in response to the direct memory access request indicating a memory read.

9. The method of tracing direct memory access according to claim 8 further comprising an additional step of issuing the memory controller from the debug controller the memory read access for the memory read.

10. The method of tracing direct memory access according to claim 7 wherein the memory write request indicates writing of combined data of write data and a next access address in the memory in response to the direct memory access request indicating a memory write.

11. The method of tracing direct memory access according to claim 7 wherein the memory write request indicates writing at a corresponding address in the memory in response to the direct memory access request, the method further comprising additional steps of performing a read access and reporting to the processor upon detecting a predetermined marking indicative of prohibited access of an data area referenced by the corresponding address by said direct memory access controller during a normal operation.

12. The method of tracing direct memory access according to claim 7 wherein the memory write request indicates writing at a corresponding address in the memory in response to the direct memory access request, the method further comprising additional steps of performing a read access and reporting to the processor a result of a comparison between a first data in a data area as referenced by the corresponding address and a second data of a data area as specified in the memory write request.

13. The method of tracing direct memory access according to claim 7 wherein the debug controller receives the direct memory access request from a direct memory access controller.

14. The method of tracing direct memory access according to claim 7 wherein the debug controller receives the direct memory access request from a processor.

15. The method of tracing direct memory access according to claim 12 wherein the debug controller doubles an address area and a data area.

16. A method of tracing direct memory access, an input output control device is connected to a memory, a processor and an input output device for controlling an interface among the memory, the processor and the input output device, the processor and the input output device sharing the memory via the interface provided by the input output control device, the method comprising the steps of:

receiving at a debug controller a direct memory access request via an arbiter;

issuing a memory controller from the debug controller a memory write request for access address information for debugging in response to the direct memory access request from a direct memory access controller;

writing at least a next access address in the memory prior to performing a memory access; and accessing the memory based upon the direct memory access request.

17. The method of tracing direct memory access according to claim 16 wherein the memory write request indicates writing a next access address in the memory prior to a memory read access of reading data in response to the direct memory access request indicating a memory read.

18. The method of tracing direct memory access according to claim 17 further comprising an additional step of issuing the memory controller from the debug controller the memory read access for the memory read.

19. The method of tracing direct memory access according to claim 16 wherein the memory write request indicates writing of combined data of write data and the next access address in the memory in response to the direct memory access request indicating a memory write.

* * * * *